UNITED STATES PATENT OFFICE 2,670,381

OXIDATION OF OLEFINES

David James Hadley, Epsom Downs, and Robert Heap, Cheam, England, and Robert James Nichol, Belfast, Northern Ireland, assignors to The Distillers Company Limited, Edinburgh, Scotland, a British company No Drawing. Application November 8, 1951, Serial No. 255,552

Claims priority, application Great Britain July 23, 1948

17 Claims. (Cl. 260—604)

This invention relates to an improvement in and a process for the oxidation of olefines, in particular to the oxidation of propylene and isobutene and the manufacture thereby of acrolein and methacrolein and is a continuation-in-part of our application Serial No. 97,486 filed June 6th, 1949 and which has been abandoned since the filing of the present application.

In our copending United States application Serial No. 44,800 filed August 17th, 1948, there is described the oxidation of propylene and isobutene with molecular oxygen-containing gases by means of contact materials which comprise initially copper oxide which has been deposited on silica gel as support. According to the said application, the oxidation process is greatly facilitated and the yield of useful oxidation products very considerably improved by the presence in the reaction zone of elementary selenium. The latter may be admixed initially with the solid contact material or it may be generated in situ from selenium compounds such as selenides which decompose under the reaction conditions with the liberation of elementary selenium, or it may be added to the reacting gases in the form of vapours.

One object of the invention is to provide an improved process for the manufacture of acrolein and methacrolein by the oxidation of propylene and isobutene respectively. A further object of the invention is to provide a process for the manufacture of acrolein and methacrolein whereby certain scarce materials are used in much smaller quantities than hitherto.

The invention accordingly comprises the novel processes and steps of processes, specific embodiments of which are described hereinafter by way of example and in accordance with which it is now preferred to practise the invention.

It has now been found that activated alumina is an excellent carrier material for the copper oxide catalyst and that this mixture in conjunction with elementary selenium acts as a very efficient contact material for the oxidation of propylene or isobutene and the production thereby of the unsaturated aldehydes, acrolein and methacrolein.

Accordingly, the process for the manufacture of acrolein and methacrolein by the catalytic oxidation of propylene and isobutene respectively with gases containing molecular oxygen at temperatures between 210 and 400° C. comprises passing the reacting gases in the presence of elementary selenium over a contact material which comprises initially copper oxide distributed upon activated alumina.

The production of acrolein and methacrolein in good overall-yields and with great efficiency with contact material of the said composition is the more surprising as it was found that when under reaction conditions activated alumina alone is brought into contact with the said oxidation products such as acrolein the latter is substantially completely destroyed. The term "overall yield" is used to mean the ratio $$\frac{\text{moles aldehyde produced}}{\text{moles olefine fed}}$$

and the term "efficiency" the ratio $$\frac{\text{moles aldehyde produced}}{\text{moles olefine reacted}}$$

The presence in the reaction zone of elementary selenium may be attained for instance by admixing finely divided selenium with the copper oxide after its distribution on the activated alumina support, or the elementary selenium may be generated in situ from selenium compounds, admixed with the other components forming the contact material, which under reaction conditions decompose with the liberation of elementary selenium. Such selenium compounds are, for instance, the selenides of copper, silver, cobalt, lead or the like. A preferred method of providing for the presence of elementary selenium in the reaction zone consists in adding selenium in vapour form to the olefine-oxygen mixture before the latter is passed over the contact material. This is conveniently achieved by conducting the whole or a part of the gaseous reaction mixture over or through some elementary selenium in a container in which it is maintained at an elevated temperature. By regulating this temperature and the proportion of the gas mixture brought into contact with the hot selenium it is possible to adjust the quantity of selenium vapour contained in the final mixture of the reactant gases to the desired amount.

It has been found that an amount of from 0.008 to 2.0 milligrams of selenium per litre of the reacting gas mixture produced excellent overall yields of the resulting aldehydes with high efficiency. However, we prefer to use selenium in low proportions of from 0.008 to 0.12 mgrm. per litre of gaseous reaction mixture since this results in advantages in various directions. Selenium is not a common element and as several new industrial uses have recently been found for it, it is difficult to procure the large amounts necessary for starting large scale operations. Any reduction, therefore, in the amount required for the process is advantageous. Furthermore, selenium recovery is also facilitated. This may be achieved, for instance, by cooling the reaction mixture issuing from the reaction zone and thereby condensing the bulk of the selenium in solid form.

Suitable temperatures for the oxidation reaction are between 210 and 400° C. When using this low selenium transport, reaction temperatures within the range 210 to 350° C. give good results, although we prefer to operate within the range 230–280° C. The use of lower temperatures allows a better control of the reaction and simplifies the construction of the plant.

By the reaction temperature range of 210 to 400° is meant that an isothermal reactor should be operated within the said range. Alternatively, in a large reactor where it is difficult or impossible to maintain isothermal conditions, the temperature of any portion of the catalyst bed should be within the specified range.

The efficiency of the copper oxide-activated alumina contact material may be increased considerably by subjecting said mixture to a preliminary heating at high temperatures such as 600° C. to 1200° C. preferably between 750° and 1000° C. Such heat treatment of the solid contact material prior to the introduction of the gas mixture and in the absence of selenium is carried out with the object of reducing the proportion of $CO_2$ to the desired aldehydes in the gas mixture issuing from the reaction zone and also with the object of adjusting the activity of the contact mass. In general, the wider the bore of the reactor tube the less active a contact mass is desirable in order to avoid harmful temperature rise. This is because the difficulty of removing heat evolved becomes greater as the ratio of the reactor surface available for cooling to the volume of contact material decreases. The suitable duration of the heat treatment depends on the one hand on the temperature and on the other on the desired activity. In order to produce highly active catalyst of high efficiency, suitable for being used in narrow reactor tubes, heating at 800 to 900° C. for about one to three hours may be required. For use in reactor tubes of wide bore such as are used in large scale production heating at higher temperatures for the same time or longer may be most advantageous.

When a contact material is used which has been previously heated to 900 to 1000° C., higher temperatures within the range indicated, may be applied during the reaction with advantage to offset the reduction in yield. It is also possible to use two contact material beds in series, the first containing a material which has been previously heated at 900 to 1000° C. and which is maintained at a higher reaction temperature than the second and a second bed containing a contact material heated at 800 to 900° C. which is maintained at a reaction temperature of, for instance, between 230 and 280° C.

Furthermore, the maximum rate of production of said oxidation product is reached with a heat treated contact material in a considerably shorter time than under similar conditions with a contact material which has not been subjected to such preliminary treatment.

It has been found, furthermore, that by the heat treatment the copper oxide distributed upon activated alumina is partly or substantially—depending on the temperature and time of heat treatment—converted into copper aluminate and that copper aluminate together with elementary selenium forms an efficient catalyst for the oxidation of olefines particularly of propylene and isobutene and the production thereby of acrolein and methacrolein respectively. It is, therefore, a further feature of this invention to use copper aluminate together with elementary selenium for the oxidation of propylene and isobutene and the production thereby of acrolein and methacrolein respectively.

Copper aluminate prepared in the known way such as is described in Z. Anorg. Allgem. Ch. 204, 378 (1932) may conveniently be used as solid contact material.

In carrying out the process it has been found that the solid contact material absorbs small amounts of selenium and that best results and highest yields and a constant output of the aldehyde are obtained when the selenium in the gaseous mixture is in equilibrium with that contained in the solid phase. The time required to attain this equilibrium varies with the amount of selenium contained in the gaseous mixture. Consequently, it is a preferred method of carrying out the process for the production of aldehyde to use a comparatively great amount of selenium in the gaseous mixture until this equilibrium is attained and subsequently reducing the contents of selenium to the stipulated quantity.

As oxygen-containing gas commercially pure oxygen, for instance of 96% concentration of pure oxygen, may be used. It is, however, preferred to use oxygen in admixture with inert gases or vapours such as nitrogen, carbon dioxide or steam in order to reduce explosion risks. The two last named are very suitable if the olefine is to be recycled in as much as they can be removed with ease from the gaseous mixture resulting from the reaction, for instance by condensation or scrubbing.

The composition of the mixture of the reactant gases may vary within wide limits. It has been found that a proportion of olefine in the gaseous mixture preferably not exceeding about 12% and amounting, for instance, to 10% by volume may be used with good results and that the oxygen contained in the mixture may, in this case with advantage exceed 20% oxygen. The remainder may consist of inert gases such as carbon dioxide or steam. Mixtures of the diluting inert gases may also be used. It is preferred, however, to use an amount of olefine in the gas mixture which does not substantially exceed 2%, whilst the oxygen may advantageously be not less than 10%. Such a composition offers the advantage that it is outside the explosion limit. It has the further advantage that the amount of unreacted olefine in the resulting reaction mixture can be made very small, by virtue of the high conversion rate of the olefine into the corresponding aldehyde so that a recovery of said olefine or its recycling may be dispensed with, especially when air has been used as oxidising agent.

The control of the reaction so as to give a high yield of unsaturated aldehyde is preferably effected by adjusting the amount of olefine in the feed gas so that the temperature, at the given heat transfer conditions, does not exceed the specified limit. Thus, with advantage, portions of olefine can be fed at different points of the reactor. Another useful alternative to keep the reaction under control is the use of a suitable linear velocity of the gas. We have, surprisingly, found that by lowering the linear velocity the heat output is spread more evenly over the catalyst and thus the required control of the temperature limit is considerably facilitated.

In general, the contact time of the gas mixture with the copper aluminate should be not more than 12 seconds, and times of about half this are often satisfactory.

The process of the invention can be operated in a recycle system in which part of the aldehyde is removed from the gaseous mixture issuing from the reaction zone and the remainder of the gas mixture still containing aldehyde is returned to the reaction zone after having been mixed with fresh olefine, oxygen-containing gases and selenium, whilst a corresponding amount of the gaseous mixture is withdrawn, freed from aldehyde and selenium and vented.

The catalyst according to the present invention remains active and retains its efficiency even after 2000 hours of continuous use and has the special advantage that it does not disintegrate to any substantial extent during its preparation and its use, and can be employed in the form of large size particles suitable for large scale production.

The following examples illustrate the manner in which the process of the invention may be carried out in practice.

*Example 1*

Activated alumina in granular form was impregnated with copper oxide by immersing it into a hot aqueous solution of copper nitrate $$Cu(NO_3)_2 \cdot 3H_2O$$

The mixture, after having been dried was heated gradually in a current of air to about 450° C., until all nitrous fumes had been expelled and finally heated to a temperature of about 850° C. for 1½ hours.

8 grams of the thus prepared contact material was placed in a helix of 6 mm. bore tubing of Pyrex glass (registered trade-mark) fitted with 2 inlets, one of 6 mm. bore and the second of 20 mm. bore to accommodate a small Pyrex glass cup suspended from a bung in the top of the inlet and filled with selenium. The helix was placed in a bath of a mixture of sodium nitrite and potassium nitrate which was maintained at 320° C., and the selenium-filled cup inserted in such a way that it was below the liquid surface. 25 litres per hour of a mixture consisting of 2% by volume propylene, 20% oxygen and 78% carbon dioxide, was passed over the selenium in the cup from which about 0.02 gram per hour was vaporized and then over the contact material. The propylene was converted into acrolein with an overall yield of 77% and an efficiency of 84%.

*Example 2*

The contact material was prepared similarly to that described in Example 1 with the exception that it was not subjected to the heat treatment subsequent to the ignition of the copper nitrate. The oxidation process was then effected under the same conditions and in the same way as described in Example 1. The overall yield of acrolein production calculated on the propylene used was 49% and its efficiency 70%.

*Example 3*

The contact material was prepared as described in Example 1 with the exception that the subsequent heat treatment was carried out at 800° C. The composition of the gaseous reaction mixture introduced into the reaction zone was isobutene 2%, oxygen 20% and carbon dioxide 78%.

The oxidation reaction was carried out under the same conditions and in the same way as described in Example 1.

The isobutene was converted into methacrolein with an overall yield of 23% and an efficiency of 37%.

*Example 4*

The contact material was prepared as described in Example 1 with the exception that the subsequent heat treatment was carried out at 1200° C. for 1½ hours. The gas mixture introduced into the reaction zone was similar to that used in Example 3. The isobutene was converted into methacrolein with an overall yield of 22% and an efficiency of 51%.

*Example 5*

Copper aluminate was prepared by evaporating to dryness an equimolar solution of $Cu(NO_3)_2$ and $Al_2(SO_4)_3$ and heating the residue to 950° C. for 5 hours. The product was extracted with hot dilute nitric acid to remove any free oxide, dried and compressed into pellets ⅛" diameter and 1/16" long.

25 litres per hour of a 2% propylene in air mixture together with 0.02 gram per hour of selenium was passed over 8 grams of these pellets at 320° C.

20% of the propylene was converted to acrolein and 2% to $CO_2$ and water.

*Example 6*

A catalyst was prepared by adding 100 parts by weight of 8–18 mesh (B. S. S. sieves) activated alumina to a solution of 100 parts $Cu(NO_3)_2 \cdot 3H_2O$ in 40 parts of water. The mixture was avaporated to dryness with frequent stirring and was then heated in a stream of air at 400° C. until evolution of nitrogen oxide ceased. Finally, it was heated for 1½ hours at 850° C.

32 grams of this contact material was placed in a helix of 6 mm. bore "Pyrex" (registered trade-mark) glass tubing fitted with a vertical inlet which accommodated a small glass cup suspended from a bung at the top of the inlet and filled with selenium. The helix was placed in a liquid bath heated to 280° C. and the selenium-filled cup inserted in such a way that it was below the liquid surface. 25 litres per hour of a mixture of 2% by volume of propylene in air was passed over the cup and then over the contact material. The transport of selenium was adjusted by altering the dimensions of the cup. After 22 hours, during which a gaseous mixture containing a comparative high selenium content in the gaseous mixture, passed through the helix, the content was reduced to 0.08 milligram per litre and the temperature was maintained at 280° C., and an overall yield of 70% of acrolein with an efficiency of 72%, resulted, "yield" and "efficiency" having the meanings indicated hereinbefore.

Example 7

A tubular steel reactor, with a diameter of 5.8 centimetres, heated by means of a jacket through which hot flue gas was circulated, was filled to a depth of 106 centimetres with a catalyst prepared as described in Example 6. In this case, however, catalyst granules of 2–8 mesh (B. S. S. sieves) were used.

A stream of 1130 litres per hour of a mixture of 1.0% v./v. propylene in air (measured at room temperature and pressure) was passed over a small steel tray containing selenium in a chamber surrounded by a jacket through which oil was circulated at 280° C. The area of selenium exposed was such that each litre of gas (measured at room temperature and pressure) became charged with 0.7 milligram of selenium vapour. Without further cooling the gas was then passed into the catalyst, round which flue gas was circulated at 280° C.

After 24 hours the area of exposed selenium was reduced so that the gas passing over it acquired only 0.07 milligram per litre. At the same time the temperature of the flue gas round the reactor was reduced to 236° C. and the gas leaving the selenium chamber was cooled to 230° C. before entering the reactor.

After a further 24 hours the concentration of propylene in the inlet gas was increased to 1.63% v./v. It was then observed that the maximum temperature registered by a thermocouple moved along the axis of the catalyst bed was 295° C. and the overall yield of acrolein was 70.3% at an efficiency of 79%.

Example 8

A copper/alumina catalyst was prepared by the method described in the Example 6 except that the final heat treatment was at 1,000° C. and lasted for 6 hours. 16 grams of this was placed in the apparatus described in the same example and there was fed into it per hour 25 litres of a mixture of 2% v./v. propylene in air to which was added 0.06 milligram selenium per litre of gas. The following results were obtained at different temperatures of the reactor bath:

| Reactor bath temperature, °C. | Percent overall yield acrolein | Percent efficiency of conversion |
| --- | --- | --- |
| 280 | 6 | 70 |
| 320 | 15 | 70 |
| 340 | 20 | 67 |

We claim:

1. Process for the manufacture of an unsaturated aldehyde selected from the group consisting of acrolein and methacrolein by the catalytic oxidation of olefines selected from the group consisting of propylene and isobutene with gases containing molecular oxygen at temperatures between 210° and 400° C. which comprises passing the reacting gases in the presence of elementary selenium over a contact material comprising copper aluminate.

2. Process as claimed in claim 1, wherein the contact material is prepared from copper oxide and activated alumina by heating at temperatures between 600° and 1200° C.

3. Process according to claim 1, wherein the elementary selenium is added to the reacting gases in vapour form.

4. Process according to claim 3, wherein the amount of selenium per litre of gas mixture introduced into the reaction zone is from 0.008 to 2 milligrams.

5. Process according to claim 4, wherein when the amount of selenium per litre of gas mixture introduced into the reaction zone is less than 0.12 milligram, the contact material is prepared from copper oxide and activated alumina by heating at temperatures between 750° and 1,000° C. and the reaction zone is held at temperatures between 210° and 350° C.

6. Process according to claim 5, wherein the contact material is heated at temperatures between 800° and 900° C. and the reaction zone is held at temperatures between 230° and 280° C.

7. Process according to claim 5, wherein the contact material is heated at temperatures between 900° and 1,000° C. and the reaction zone is held at temperatures between 280° C. and 350° C.

8. Process according to claim 5, wherein two reactors in series are used, the first containing contact material which has been previously heated at 900° to 1,000° C. and maintained at a higher temperature than the second reactor which contains contact material previously heated at 800° to 900° C. and which is maintained at a temperature of 230° to 280° C.

9. Process according to claim 3, wherein the solid contact material contains sufficient selenium to be in equilibrium with the selenium in the gas mixture.

10. Process according to claim 9, wherein the contact material containing absorbed selenium is produced by temporarily raising the selenium content of the gas mixture.

11. Process according to claim 1, wherein part of the aldehyde is removed from the gaseous mixture issuing from the reaction zone while the remaining gases are returned to the reaction zone after having been mixed with fresh olefine-oxygen-containing gases and selenium.

12. Process according to claim 1, wherein the amount of olefine introduced into the gas mixture is adjusted to maintain the temperature of the reaction zone within the required range.

13. Process according to claim 1, wherein portions of the olefine are introduced at different points in the reaction zone.

14. Process according to claim 1, wherein the contact time of the gas mixture with the copper aluminate is not more than 12 seconds.

15. Process for the manufacture of an unsaturated aldehyde selected from the group consisting of acrolein and methacrolein by the catalytic oxidation of the olefines selected from the group consisting of propylene and isobutene with gases containing molecular oxygen at temperatures between 210° and 400° C. which comprises passing the reactant gases in the proportions of about 2% olefine, from about 10 to 20% oxygen, and from 88 to 78% of an inert diluent selected from the group consisting of nitrogen, carbon dioxide and steam in the presence of elementary selenium over a contact material which contains copper aluminate.

16. Contact material for the manufacture of an unsaturated aldehyde selected from the group consisting of acrolein and methacrolein by the catalytic oxidation of the olefines selected from the group consisting of propylene and isobutene with gases containing molecular oxygen which comprises copper aluminate in admixture with elementary selenium.

17. A process for the preparation of a contact material comprising copper aluminate in admixture with elementary selenium and which is useful in the manufacture of an unsaturated aldehyde selected from the group consisting of acrolein and methacrolein by the catalytic oxidation of an olefine selected from the group consisting of propylene and isobutene with gases containing molecular oxygen, which comprises the steps of distributing copper oxide on activated alumina and heating the resultant mixture to a temperature between 600° and 1200° C., whereby at least a portion of the mixture is converted into copper aluminate, and thereafter admixing the resultant composite with elementary selenium.

DAVID JAMES HADLEY.
    ROBERT HEAP.
    ROBERT JAMES NICHOL.

References Cited in the file of this patent

UNITED STATES PATENTS

| Number | Name | Date |
|---|---|---|
| 2,383,711 | Clark et al. | Aug. 28, 1945 |
| 2,446,132 | Evans | July 27, 1948 |
| 2,486,842 | Hearne et al. | Nov. 1, 1949 |
| 2,593,437 | Goodings et al. | Apr. 22, 1952 |

FOREIGN PATENTS

| Number | Country | Date |
|---|---|---|
| 625,330 | Great Britain | June 27, 1949 |